Jan. 12, 1971 McKENNY W. EGERTON, JR., ET AL 3,555,541

ELECTRONIC ANGLE SIGNAL MODIFIER AND ENCODER

Filed Oct. 21, 1966 6 Sheets-Sheet 1

INVENTORS
McKENNY W. EGERTON, JR.
GERARD B. GILBERT, JR.

*INVENTORS*
McKENNY W. EGERTON, JR.
GERARD B. GILBERT, JR.

INVENTORS
McKENNY W. EGERTON, JR.
GERARD B. GILBERT, JR.

*INVENTORS*
McKENNY W. EGERTON, JR.
GERARD B. GILBERT, JR.

ELECTRONIC ANGLE SIGNAL MODIFIER AND ENCODER

Filed Oct. 21, 1966 6 Sheets-Sheet 5

*INVENTORS*

McKENNY W. EGERTON, JR.

GERARD B. GILBERT, JR.

ELECTRONIC ANGLE SIGNAL MODIFIER AND ENCODER

Filed Oct. 21, 1966 6 Sheets-Sheet 6

*INVENTORS*
McKENNY W. EGERTON, JR.
GERARD B. GILBERT, JR.

3,555,541
Patented Jan. 12, 1971

3,555,541

ELECTRONIC ANGLE SIGNAL MODIFIER AND ENCODER

McKenny W. Egerton, Jr., Owings Mill, and Gerard B. Gilbert, Jr., Baltimore, Md., assignors, by mesne assignments, to The Bendix Corporation, a corporation of Delaware Filed Oct. 21, 1966, Ser. No. 588,408
Int. Cl. G01b *7/30;* G06g *7/22;* H03k *13/02*
U.S. Cl. 340—347 17 Claims

ABSTRACT OF THE DISCLOSURE

An electronic angle encoder which employs interconnected sine and cosine channels to convert a resolver or synchro analog angle signal into a binary digital signal. The input sine and cosine signals are stored in the encoder and subsequently changed in binarily diminishing steps toward a known reference level. After each step, the stored values are compared to a reference. The result of this comparison constitutes the digital representation of the original angle.

This invention relates to a device for generating a digital code representing an angle such as the angle of a rotary shaft and more particularly, is directed to a converter for producing a binary output representative of shaft angle signals received from a conventional synchro or resolver. The device of the present invention involves no trigonometric approximation and produces a theoretically exact output within the resolution of the system. In the preferred embodiment the output is a straight binary representation of a resolver or synchro shaft angle.

Conventional angle encoders based on inputs from synchros or resolvers often involve a servo follow-up system for reproducing the shaft position which position is then read by the use of code discs. Electronic angle encoders have also been proposed. These are based on deriving samples of voltages proportional to the sine and cosine of the shaft angle and encoding a ratio (such as the tangent) which approximates the angle. For example, the equation:

$$\theta_A = \frac{\sin \theta}{K_1 + K_2 \cos \theta_s} \qquad (1)$$

has been used in which the approximation angle $\theta_A$ is determined by the shaft angle $\theta_s$, and $K_1$ and $K_2$ are proportionality factors. However, for most approximation systems, it is necessary to restrict the shaft angle $\theta_s$ to a small sector near zero degrees for satisfactory accuracy. This has the serious disadvantage of requiring a complicated sector determination and added equipment for shifting the actual angle into the somewhat limited operating sector.

The present invention avoids the above mentioned difficulties by utilizing a direct electronic angle signal modifier which does not involve any theoretical approximation. The device of the present invention receives analog quantities proportional to the sine and cosine of an angle and produces an output proportional to the sine and cosine of a new angle, which new angle is equal to the original angle increased or decreased by a predetermined number of degrees.

The electronic angle signal modifier of this invention is based upon well known trigonometric identities which state that the sine and cosine of the new angle are functions of the tangent of the angle of increase or decrease in addition to the sine and cosine of the original angle. This makes possible a simplified circuit arrangement which need generate only the tangent of a known angle since the sine and cosine of the original angle are available at the input of the device, i.e., the output of a conventional synchro or resolver.

If the original angle is modified in binarily decreasing steps toward a known reference value through a successive approximation technique, a binary output is obtained representative of the original angle with the most significant digit occurring first. The device is of relatively simple inexpensive construction requiring a minimum of electrical components and operates in a manner to produce a digital output which represents the shaft angle of the synchro or resolver to the nearest quantizing level with no approximation. Rapid speed of operation makes the wholly electronic device of this disclosure particularly adapted for high speed multiplexing where it is desired to encode the angles of several shafts in a short period of time. It finds particular utility in fire control, navigation, guidance, and radar where it is often desirable to determine in digital quantities, the position of several shafts representative of pitch, roll, and yaw or azimuth, range and elevation, or where it is necessary to encode a plurality of resolvers indicative of such features as rate, position, and the like. Through modern circuit techniques, the device of this invention may be manufactured to have a very small size and weight making it particularly suited for telemetering and other applications in aerospace environments.

It is therefore one object of the present invention to provide a novel angle encoder or converter.

Another object of the invention is to provide a novel method of encoding angles.

Another object of this invention is to provide an angle encoder particularly suited for encoding the output of a conventional synchro or resolver.

Another object of the present invention is to provide a novel electronic angle signal modifier.

Another object of the invention is to provide a novel method of electronically modifying an angle signal.

Another object of the present invention is to provide an analog-to-digital converter for encoding shaft and other angles without trigonometric approximation.

Another object of the present invention is to provide a simplified and inexpensive purely electronic encoder for producing a digital and preferably binary output representative of shaft angles.

Another object of the present invention is to provide an angle encoder which operates on the sine and cosine of an angle so as to change this angle in diminishing steps toward a known reference level. In the preferred embodiment the input quantities are stored in the encoder and after each electrical step, the stored values are compared with a known reference. Outputs are produced by a comparator in accordance with the signs of the stored quantities, which outputs constitute a digital representation of the original shaft angle. The stored quantities within the converter are preferably changed in such a manner as to modify the angle in binarily decreasing steps so as to produce a standard binary type output signal from the comparator representative of shaft angle.

These and further objects and advantages of the invention will be more apparent upon reference to the following specification, claims, and appended drawings wherein:

Figure 1:
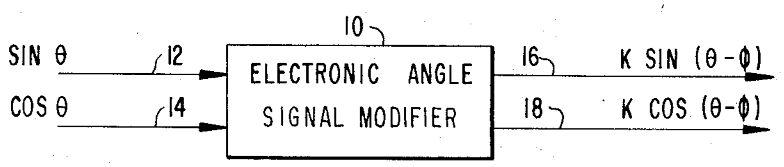
FIG. 1 is a generalized function diagram of the electronic angle signal modifier used in the present invention.

Referring to the drawings and particularly to FIG. 1, the electronic angle signal modifier used in the encoder of the present invention as generally indicated at 10 is provided with a pair of inputs 12 and 14 adapted to receive signals representative of the sine and cosine respectively of an angle $\theta$ to be encoded. These signals may be derived directly from a resolver or through a Scott Transformer from a synchro in a well known manner. At the output 16 of rotator 10 appears a signal representative of the sine of a new angle consisting of the original angle $\theta$ and the angle $\phi$ of increase or decrease, the latter representing the angle by which $\theta$ has been changed. The output is represented by the quantity $K \sin (\theta-\phi)$, in which K is a proportionality factor as explained more fully below. The output appearing at output lead 18 similarly is represented by the quantity $K \cos (\theta-\phi)$ wherein the proportionality factor K and the angles $\theta$ and $\phi$ are as defined above. The operation of the signal modifier 10 is linear if $\phi$ is regarded as a constant and is based upon the following trigonometric identities given below as Equation 2:

$$\begin{aligned} \text{Secant } \phi \text{ sine } (\theta-\phi) &= \text{sine } \theta - \text{tangent } \phi \text{ cosine } \theta \\ \text{Secant } \phi \text{ cosine } (\theta-\phi) &= \text{cosine } \theta + \text{tangent } \phi \text{ sine } \theta \end{aligned} \quad (2)$$

The above identities may be readily derived from the following perhaps better known identities appearing in almost every text book on trigonometry.

$$\begin{aligned} \text{Sine } (\theta-\phi) &= \text{sine } \theta \text{ cosine } \phi - \text{cosine } \theta \text{ sine } \phi \\ \text{Cosine } (\theta-\phi) &= \text{cosine } \theta \text{ cosine } \phi + \text{sine } \theta \text{ sine } \phi \end{aligned} \quad (3)$$

In order to produce an electrical change of the original angle $\theta$ by $(-\phi)°$ it is necessary to subtract tangent $\phi$ cosine $\theta$ from sine $\theta$ and at the same time add tangent $\phi$ sine $\theta$ to cosine $\theta$. The secant $\phi$ terms in Equation 2 are represented by the proportionality factors K in FIG. 1 at the output leads 16 and 18. As more fully described below, in the preferred embodiment $\phi$ varies between 0° and 45° so that secant $\phi$ is always a positive quantity between $\sqrt{2}$ and 1, which while affecting the amplitude of the analog signals, does not change their signs or ratio and therefore does not affect the digital output in the encoding process.

Figure 2:
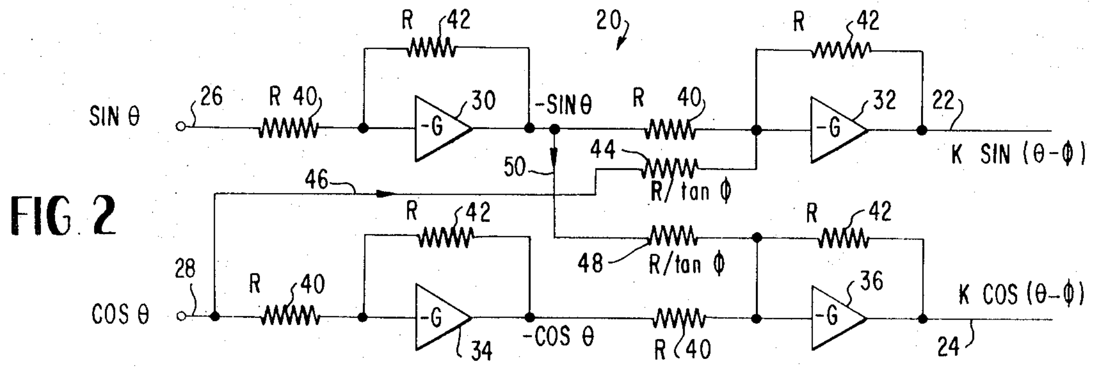
FIG. 2 is a simplified block diagram showing an electronic angle signal modifier constructed in accordance with the function diagram of FIG. 1.

FIG. 2 is a circuit diagram showing an electronic angle signal rotator 20 of the type illustrated in FIG. 1 for producing an output $K$ sine $(\theta-\phi)$ at one output terminal 22 and for producing $K$ cosine $(\theta-\phi)$ at the other output 24 when sine $\theta$ is applied to input terminal 26 and cosine $\theta$ is applied to input terminal 28. The circuit of FIG. 2 operates on the principal of the trigonometric identities given in Equation 2 above and incorporates four operational amplifiers 30, 32, 34, and 36. Each amplifier includes an input resistor 40 and a feedback resistor 42 all of which for the sake of simplicity are illustrated as having an equal resistance R. Each of the operational amplifiers acts as an inverter so that with sine $\theta$ appearing at the input 26 an electrical signal equal to the value $-$sine $\theta$ appears at the output of amiplifier 30. Similarly a signal equal to the value $-$cosine $\theta$ appears at the output of operational amplifier 34 when cosine $\theta$ is applied to input terminal 28. $-$Sine $\theta$ is inverted through amplifier 32 and $-$cosine $\theta$ is inverted through amplifier 36 so as to become positive at the output terminals 22 and 24.

In accordance with the trigonometric identities given in Equation 2, connections are provided for incorporating a tangent $\phi$ term into the device to produce the outputs $K$ sine $(\theta-\phi)$ and $K$ cosine $(\theta-\phi)$. In FIG. 2 these take the form of a first resistor 44 connected by lead 46 between input terminal 28 and feedback resistor 42 of operational amplifier 32. This resistor 44 has a resistance value equal to $R$/tangent $\phi$ where $\phi$ is a known angle to be subtracted from the angle represented by the input signal. This connection supplies to the sine channel the quantity ($-$tangent $\phi$ cosine $\theta$) forming a part of the upper trigonometric identity of Equation 2. A similar resistor 48 is connected by lead 50 between the output of operational amplifier 30 and the feedback resistor 42 of operational amplifier 36. Because of the inverting properties of amplifier 36, this minus sine term becomes positive at the output terminal 24 and since resistor 48 also has a resistance value equal to $R$/tangent $\phi$ it supplies the quantity (+tangent $\phi$ sine $\theta$) to the cosine channel which quantity forms a part of the second trigonometric identity of Equation 2.

The specific circuit illustrated in FIG. 2 can obviously be modified to work in regions where the tangent of $\phi$ approaches infinity. However, rotation of plus or minus 90° can also be obtained by inverting the sine or cosine and intetrchanging the output leads in a manner that is readily apparent. These operations are based on the well known equations:

$$\begin{aligned} \text{Sine } (\theta \pm 90°) &= \pm\text{cosine } \theta \\ \text{Cosine } (\theta \pm 90°) &= \pm\text{sine } \theta \end{aligned} \quad (4)$$

Since the sine of $(\theta \pm 180°) = \mp$ sine $\theta$, a rotation of 180° can be obtained by inverting both the sine and the cosine signals.

Figures 3, 4:
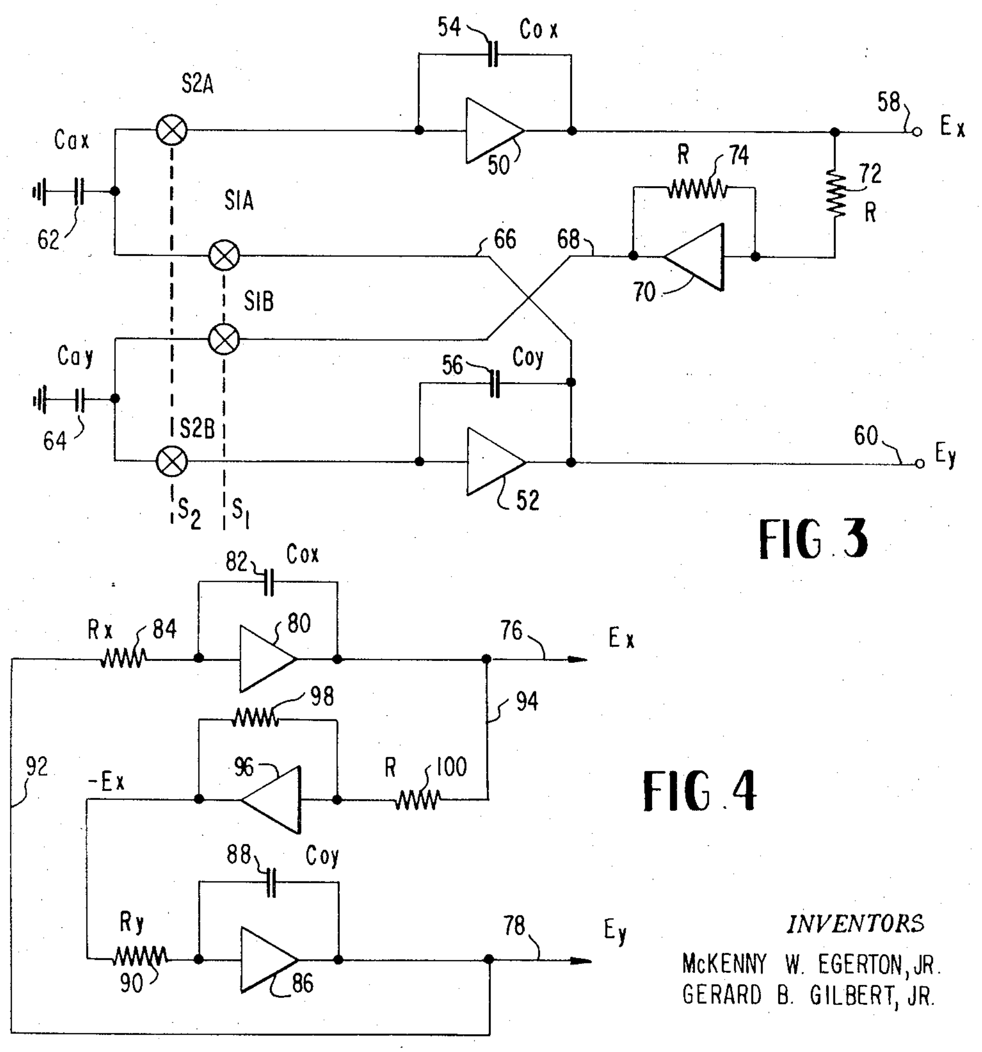
FIG. 3 is a simplified circuit diagram illustrating a novel arrangement for modifying a stored signal in discrete steps as a function of the tangent of a known angle.
FIG. 4 is a circuit diagram showing a continuous version of the signal modifier of FIG. 1.

By providing storage and feedback within the circuit of FIG. 2, the voltages representative of sine $\theta$ and cosine $\theta$ can be changed either continuously or in discrete steps. The original angle $\theta$ may then be determined by the total rotation $\phi_t$ required to reduce sine $(\theta-\phi_t)$ to zero when cosine $(\theta-\phi_t)$ is positive (or by reducing it to some other reference angle as desired). A novel electronic angle signal modifier involving storage and providing for angle change in discrete steps is illustrated in FIG. 3.

In that figure, a pair of charge transfer amplifiers 50 and 52 having a high negative gain are provided with feedback capacitors 54 and 56 with sufficient feedback to maintain the inputs of the amplifiers 50 and 52 at virtual ground much in the manner of the operational amplifiers previously described. Initial charges on capacitors 54 and 56 labeled $C_{ox}$ and $C_{oy}$ respectively in FIG. 3 produce voltages $E_x$ and $E_y$ at the output terminals 58 and 60 respectively. A pair of additional capacitors 62 and 64 labeled $C_{ax}$ and $C_{ay}$ respectively each have one side connected to the circuit ground and their other sides connected to a pair of ganged switches labeled $S_1$ and $S_2$. A lead 66 connects the capacitor 62 through switch section $S_{1a}$ to the output terminal 60 at the output of amplifier 52. A similar lead 68 couples capacitor 64 through switch section $S_{1b}$ to the output terminal 58 at the output of amplifier 50. This connection is through operational amplifier 70 having input resistor 72 and feedback resistor 74 of equal resistance R. Operational amplifier 70 acts as an inverter producing the signal $-E_x$ at its output.

Assuming that capacitors 62 and 64 are initially discharged, when $S_1$ is operated a charge $-C_{ay} E_x$ is placed on capacitor 64 and a charge $C_{ax}E_y$ is placed on capacitor 62. If switch $S_1$ now opens and switch $S_2$ closes, these charges are transferred into the storage amplifiers 50 and 52. The values of the new output voltages E′ become:

$$E'_x = E_x - \frac{C_{ax}E_y}{C_{ox}} \text{ and } E'_y = E_y + \frac{C_{ay}E_x}{C_{oy}} \quad (5)$$

Equation 5 with $$\frac{C_{ax}}{C_{ox}} = \frac{C_{ay}}{C_{oy}}$$

may be compared with the trigonometric identities for sine and cosine of the sum or differences to two angles given in Equation 2. It can be seen that if $E_x$ equals sine $\theta$ and $E_y$ equals cosine $\theta$ the operation of $S_1$ and then $S_2$ corresponds to a rotation of $-\phi$. In a similar way if $E_x$=cosine $\theta$, and $E_y$=sine $\theta$, then the rotation is $+\theta$. In each case:

$$\text{Tangent } \theta = \frac{C_a}{C_o} = \frac{C_{ax}}{C_{ox}} = \frac{C_{ay}}{C_{oy}}$$

The circuit of FIG. 3 can be used as an angle encoder by providing circuitry for setting the voltages $E_x$ and $E_y$ equal to the sine and cosine of an unknown angle $\theta$. This may be simply done by placing a sample of the resolver output sine and cosine signals initially on the capacitors 54 and 56. With the angle $\phi$ equal to the desired resolution, then by counting the number of $S_1$ and $S_2$ operations required to first reduce $E_x$ to zero when $E_y$ is negative, the angle $\theta$ of the resolver shaft can be found.

FIG. 4 shows an electronic angle signal modifier constructed in accordance with FIG. 1 and usable for continuous conversion. Devices of this type are well known in analog computer operations. (Korn & Korn, Electronic Analog Computers pp. 9, published by McGraw-Hill Book Co., second edition, copyright 1956). In this embodiment the output terminals labeled 76 and 78 are again at potentials $E_x$ and $E_y$ respectively. To output terminal 76 is connected an operational amplifier 80 having a feedback storage capacitor 82 labeled $C_{ox}$ and an input resistor 84 labeled $R_x$. Output terminal 78 is similarly connected to an operational amplifier 86 having a feedback storage capacitor 88 labeled $C_{oy}$ and an input resistor 90 labeled $R_y$. The output of operational amplifier 86 is connected to the input of operational amplifier 80, i.e., through resistor 84 by way of lead 92. Similarly, lead 94 connects the output of operational amplifier 80 at potential $E_x$ to the input resistor 90 of operational amplifier 86. This connection is by way of an inverting operational amplifier 96 including feedback resistor 98 and input resistor 100. The output from inverter amplifier 96 is $-E_x$.

In FIG. 4 the resistors $R_x$ and $R_y$ feed a current proportional to $E_y$ into storage capacitor 82 ($C_{ox}$) and a current proportional to $-E_x$ into storage capacitor 88 ($C_{oy}$). For the case of equal time constants, $$R_xC_{ox} = R_yC_{oy}$$

a solution of the differential equation for the circuit of FIG. 4 results in Equation 6 below if $E_x(t=0) = -$sine $\theta$ and $E_y(t=0) = -$cosine $\theta$;

$$E_x = \text{sine } (T/RC - \theta)$$

and $$E_y = -\text{cosine } (T/RC - \theta) \quad (6)$$

By measuring the time T it takes until $E_x$ first equals zero when $E_y$ is negative, the angle may be found, since $T/RC-\theta=0$ at this time so that $\theta=T/RC$. The operation of this angle encoder is somewhat similar to a ramp encoder except that the internally generated functions are sine $T/RC$ and cosine $T/RC$ rather than KT which would be used for linear encoding. The time interval may be measured with a clock and counter such as is done in the ramp type encoders.

Figure 5:
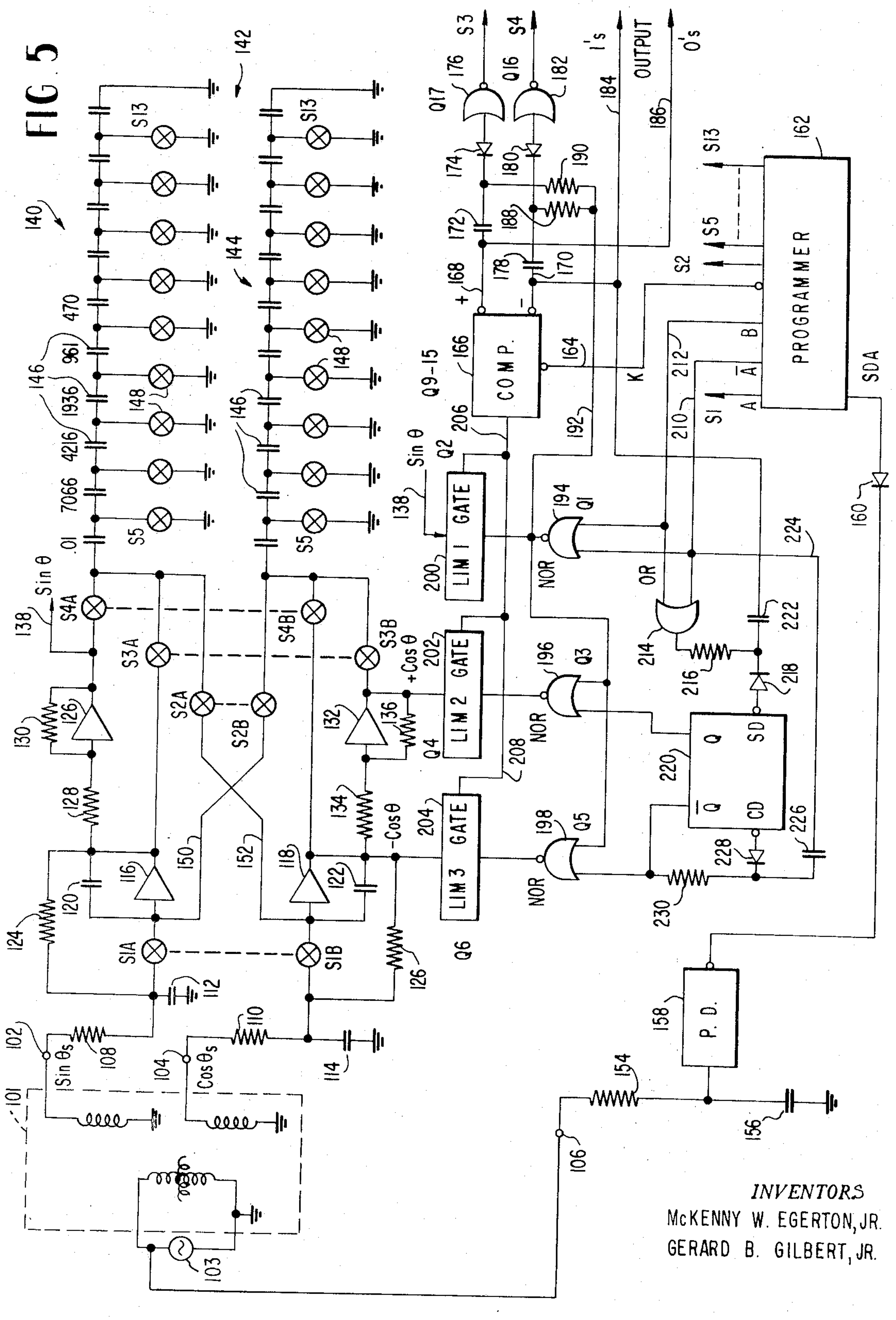
FIG. 5 is a detailed block diagram of a preferred angle encoder constructed in accordance with the present invention.

FIG. 5 shows a preferred encoder constructed in accordance with the present invention utilizing the novel electronic angle signal modifier of FIG. 3. Referring to FIG. 5, input terminals 102 and 104 receive alternating voltage signals from a conventional resolver (indicated by the dashed box 101) representative of the sine and cosine respectively of the angles $\theta_S$ of the resolver shaft. These signals are conventionally AC signals frequently of approximately 400 cycles per second which in a well known manner vary in amplitude according to shaft angle. The excitation voltage 103 from the synchro or resolver is applied to a third input terminal 106 for a purpose more fully described below. It should be noted here that the converter or encoder described does not rely upon the excitation voltage for conversion, that is, the converter does not operate on the excitation voltage, but rather uses the excitation voltage only as a time reference or clock for programming the encoder. This important feature additionally contributes to the improved accuracy and reliability of the device herein disclosed.

The sine and cosine signals are applied through input resistors 108 and 110 and input capacitors 112 and 114 to charge storage or transfer amplifiers 116 and 118 respectively. The latter are similar to amplifiers 50 and 52 of FIG. 3 in that they are high negative gain amplifiers heavily fed back through storage capacitors 120 and 122 such that the input terminal of the amplifier is maintained at a virtual ground by feedback. Resistors 124 and 126 are connected around the amplifiers to cancel the residue from previous encodings. A sample of the input sine wave is stored on capacitor 120 when section $S_{1a}$ of switch $S_1$ is closed and similarly, a sample of the cosine input is stored on capacitor 122 when section $S_{1b}$ of ganged switch $S_1$ is closed. The switches in FIG. 5 are shown by general designation since any fast operating switch may be utilized. The switches are preferably transistor type switches which close when actuated or energized by a pulse and reopen shortly thereafter.

Storage amplifier 116 in the sine channel is connected to an operational amplifier 126 which acts as an inverter and which includes an input resistor 128 and feedback resistor 130. If the input to terminal 102 is +sine $\theta$ then the output from amplifier 116 is $-$sine $\theta$ due to inversion through this amplifier but due to the second inversion through amplifier 126 the output of the latter is again +sine $\theta$.

Storage amplifier 118 in the cosine channel is similarly connected to an operational amplifier 132 having an input resistor 134 and feedback resistor 136. Again there is a double inversion such that if +cosine $\theta$ appears at input terminal 104 of the encoder then $-$cosine $\theta$ appears at the output of amplifier 118 and +cosine $\theta$ appears at the output of inverter amplifier 132. The signal sine $\theta$ is taken from the output of inverter amplifier 126 in the sine channel by way of lead 138 for a purpose more fully described below.

This same output passes through section $S_{4a}$ of a ganged switch $S_4$ to one section 140 of a capacitive ladder attenuator 142. The other section 144 of the attenuator is similarly connected through a section $S_{3b}$ of a ganged switch $S_3$ to the output of inverter amplifier 132 in the cosine channel. The attenuator sections comprise a plurality of capacitors 146 and switches 148 such that as each of the switches is closed in each attenuator section, progressively greater capacitance is coupled between the respective outputs of the inverter amplifiers 126 and 132 and the circuit ground. The action of these attenuators is similar to the capacitance ladder attenuator circuit shown and described in assignee's U.S. Pat. 3,251,052.

Instead of being coupled to the +sine $\theta$ output of inverter amplifier 126, attenuator section 140 may alternatively be coupled through switch section $S_{3a}$ to the —sine signal appearing at the output of storage amplifier 116. Similarly, instead of being connected through switch section $S_{3b}$ to the +cosine output of inverter amplifier 132, attenuator section 144 may alternatively be coupled through switch section $S_{4b}$ to the —cosine signal appearing at the output of storage amplifier 118.

Cross coupling between channels is accomplished by way of leads 150 and 152. The former couples the attenuator section 144 (and hence the output of either amplifier 118 or 132) to the input of amplifier 116. Lead 152 couples the input of attenuator section 140 (and hence the output of either amplifier 126 or 116) to the input of storage amplifier 118.

The AC excitation voltage from source 103 applied to input terminal 106 passes through input resistor 154 and input capacitor 156 to a peak detector 158. Peak detector 158 senses each negative peak of the AC excitation voltage and produces a negative going pulse for each peak which is applied through a rectifier 160 to a programmer 162. Programmer 162 controls all the switches labeled $S_1$ through $S_{13}$ and also supplies by way of lead 164 a series of control pulses to a comparator 166. Comparator 166 compares analog voltages appearing at various locations in the circuitry previously described with zero voltage and depending upon whether the analog voltage is positive or negative, produces an output pulse either on comparator output lead 168 or on output lead 170. Pulses appearing on output lead 168 pass through a capacitor 172, rectifier 174, and gate 176 to control ganged switch $S_3$. Output pulses appearing on comparator output lead 170 similarly pass through a capacitor 178, rectifier 180, and gate 182 to control the operation of ganged switch $S_4$. Digital output pulses are derived from the comparator output by way of leads 184 and 186, one output lead providing the complement of the other.

Comparator output leads 168 and 170 are also connected through resistors 188 and 190 by way of a lead 192 to three NOR logic gates 194, 196, and 198. The outputs of these gates are connected to respective limiter gates 200, 202, and 204, such that an output from the NOR gate enables a corresponding limiter gate to pass an analog signal from a particular location in the circuit to the comparator input terminal 206. When NOR gate 194 produces an output, limiter gate 200 is enabled such that a sine $\theta$ signal passes through the limiter gate from lead 138 (coupled to the output of amplifier 126) to comparator input terminal 206. When NOR gate 196 produces an output, limiter gate 202 is enabled so that a +cosine $\theta$ signal may pass through the limiter gate to the comparator input terminal 206. Similarly, when NOR gate 198 produces an output pulse, limiter gate 204 is enabled and a —cosine signal passes from the output of amplifier 118 to the input terminal 206 of the comparator by way of lead 208. The limiter gates are shown in detail in FIG. 8 and serve the dual purpose of both gating and limiting the amplitude of the analog signals supplied to the input of the comparator.

Programmer 162 in addition to controlling the various switches indicated and supplying pulses to the comparator is provided with a pair of output leads 210 and 212 labeled $\overline{A}$ and B which actuate NOR gate 194 and an additional logic OR gate 214. The output of OR gate 214 is fed through a resistor 216 and rectifier 218 to one side of a bi-stable multi-vibrator or flip flop 220. The junction of resistor 216 and rectifier 218 is connected through a capacitor 222 to the output terminal 170 of the comparator. The $\overline{A}$ (A complement) signal from programmer 162 is fed by way of lead 224 through a capacitor 226 and rectifier 228 to the other input of flip flop 220. This rectifier-capacitor junction is connected through a resistor 230 to one of the inputs of NOR logic gate 198.

Figures 6, 6A, 7:
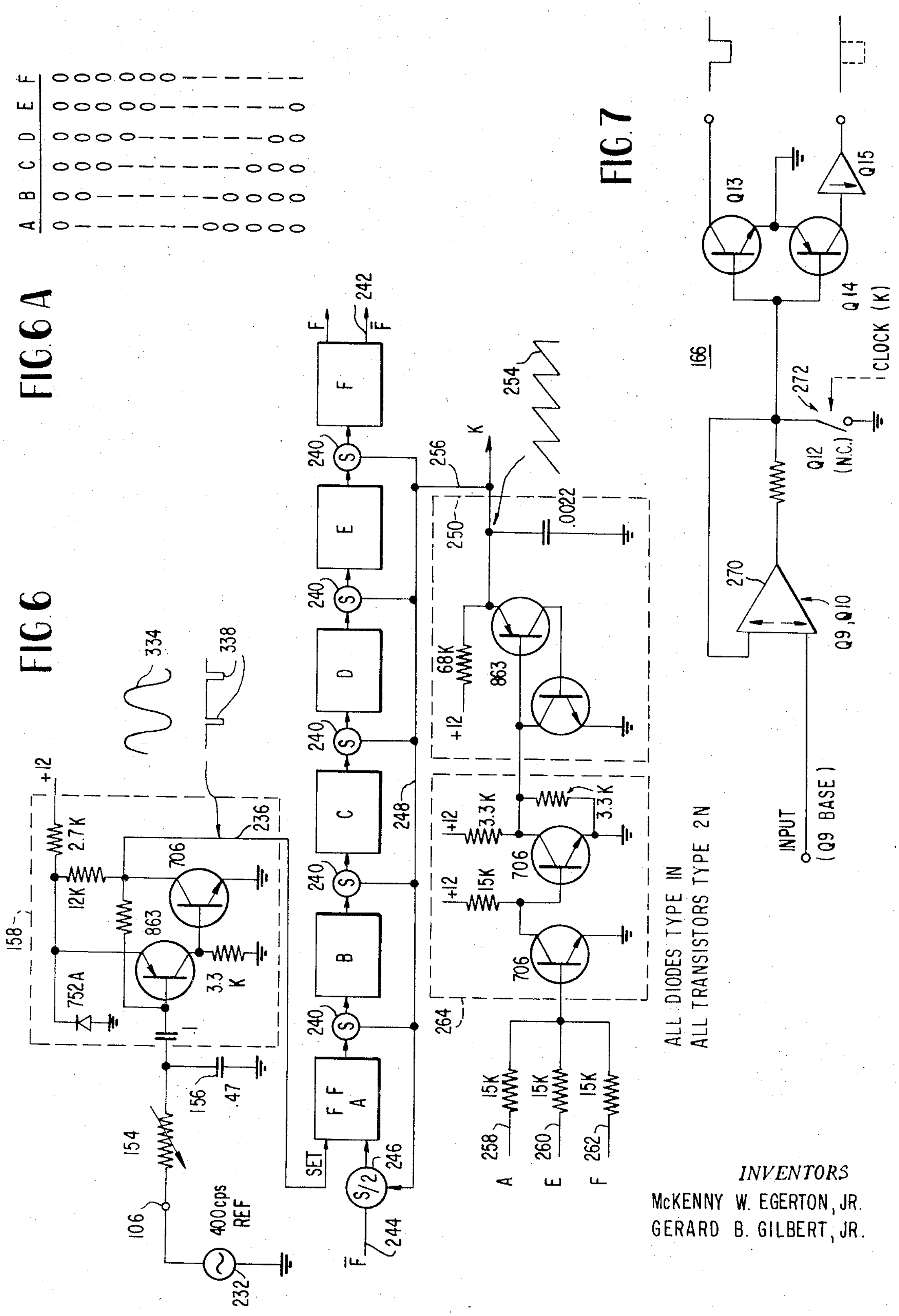
FIG. 6 is a partial schematic diagram of the programmer used with the angle encoder of FIG. 5.
FIG. 6a is a table showing the sequence of operation of the programmer of FIG. 6.
FIG. 7 is a simplified circuit diagram of the comparator used in the angle encoder of FIG. 5.

FIG. 6 is a partial schematic diagram of the programmer 162 of FIG. 5 and associated circuitry. The programmer of FIG. 6 is illustrated as incorporating six bi-stable multi-vibrators or flip flops labeled A–F and FIG. 6*a* is a table showing the state of each flip flop at various stages of an encoding period. As can be seen from the table in FIG. 6*a* at the beginning of an encoding period prior to reception of a triggering or clock pulse from the excitation input terminal 106 all of the flip flops A–F are in the off condition as represented by the zeros in the first horizontal row in FIG. 6*a*. Flip flop A is then turned on and remains on through six operation sequences (bit periods) as represented by the six ones in vertical column under A in FIG. 6*a* after which it is turned off and remains off for the next five sequences as indicated by the following five zeros in the table. The on and off states of the remaining flip flops can be determined by running down the vertical columns under the letters B–F representing the correspondingly labeled flip flops in FIG. 6.

The 400 cycle excitation source, 232 in FIG. 6 (corresponding to 103 in FIG. 5) supplies a sine wave signal to the input terminal 106 which passes through a variable input resistor 154 and capacitor 156 to the peak detector illustrated in FIG. 6 by the dashed box 158. The AC sine wave to input terminal 106 is illustrated at 334 and the output from the peak detector on lead 236 comprising negative pulses coincident in time with the negative peaks of the sine wave 334 is illustrated at 338. The input to the first flip flop A in the programmer timing chain sets the first flip flop A to the one condition as illustrated in the second horizontal row in the table in FIG. 6*a*. At this time, all the other flip flops are still in the zero state.

Connected between each adjacent set of flip-flops is a shift gate 240 of conventional construction which ties the two outputs of a preceding flip-flop into the two inputs of a succeeding flip-flop. The $\overline{F}$ output 242 from the last flip-flop F in the chain is fed back to the first flip-flop A by way of lead 244 through a half-shift gate 246.

The shift gates 240 and the half-shift gate 246 are all energized by way of lead 248 from the output of a gated oscillator indicated by the dashed box 250. This oscillator constitutes an internal clock in the programmer and is normally on, i.e., running. It produces a saw-tooth or ramp wave form illustrated at 254 which is supplied by way of leads 256 and 248 to the shift gates 240 and half-shift gate 246 to energize these gates. Each one of the saw-tooth pulses 254 represents a bit period in the encoding cycle and corresponds with one of the horizontal rows in FIG. 6*a*. Oscillator 250 is gated off by means of signals supplied to terminals 258, 260, and 262 from the respective flip-flops A, E, and F through a gating switch generally indicated by the dashed box 264. That is, when the encoder is not in operation oscillator 250 is gated off by the fact that all flip-flops are in the zero state and signals (A, E, F) are present at each of the terminals 258, 260, and 262 from the corresponding flip-flops. As soon as a set signal from the peak detector is fed over lead 236 into flip-flop A, the A signal appears at terminal 258 and oscillator 250 starts to run producing the saw-tooth wave form 254. The oscillator continues to run through a complete encoding cycle until all flip-flops return to the zero state at which time signals are again present at the terminals 258, 260, and 262 to again turn the oscillator off.

Figure 8:
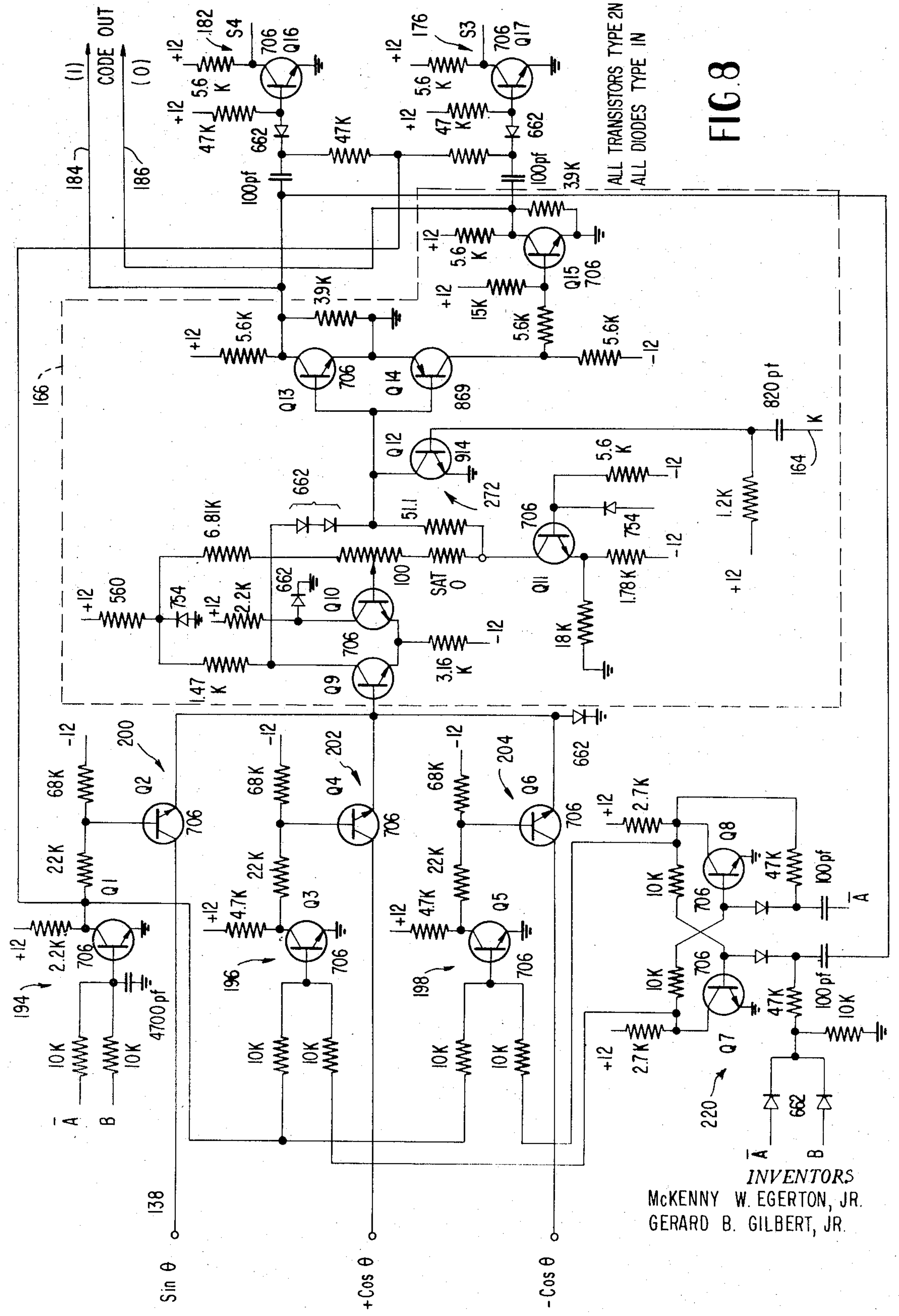
FIG. 8 is a detailed schematic diagram showing the comparator used in the angle encoder of FIG. 5.

FIG. 7 is a simplified circuit diagram of the comparator 166 of FIG. 5 and FIG. 8 is a detailed diagram of the comparator along with associated circuitry. In FIG. 8 like parts are given like reference numerals to these appearing in FIG. 5 and the various transistors are indicated by the letter Q and appropriate subscripts corresponding to those given in FIG. 5.

Referring to FIGS. 7 and 8, the comparator proper consists of transistors $Q_9$, $Q_{10}$, $Q_{12}$, $Q_{13}$, and $Q_{14}$. In FIG. 8, $Q_{11}$ is a current source and can, if desired, be replaced by a resistor. FIG. 7 is a simplified diagram illustrating the function of certain elements in FIG. 8 and includes a differential amplifier 270 consisting of transistors $Q_9$ and $Q_{10}$. The comparator input is coupled to the base of input transistor $Q_9$. Differential amplifier 270 is provided with sufficient regenerative feedback to cause the circuit to latch in the manner of a flip-flop when switching transistor 272 labeled $Q_{12}$ is opened. The polarity of the input voltage to the base of $Q_9$ determines which of the two possible states in the differential amplifier occurs. Therefore, if normally closed switch $Q_{12}$ is opened during each clock pulse fed from the programmer over lead 164, either transistor $Q_{13}$ or $Q_{14}$ of the comparator will be turned on and a negative going pulse will appear on the corresponding output lead 184 or 186. The operation of the differential amplifier may be understood if it is assumed that the regenerative loop is disconnected and the non-inverting input grounded. If the input voltage is then fairly large, the comparator will still function, but for small input voltages no output pulse will be generated. This could be partially remedied by increasing the amplifier gain, but a better solution is the addition of regenerative feedback as illustrated in FIG. 8.

Flip-flop 220 is referred to as the steering flip-flop and the exact choice of steering logic is somewhat arbitrary. It is possible for example, to force the stored angle toward zero degrees instead of 90 degrees. It is also possible to interchange the comparator output leads instead of transferring the input lead, i.e., steering the comparator to either the cosine or −cosine analog signals through limiter gates 202 and 204. However, the circle diagram of FIG. 9 helps illustrate the preferred embodiment of FIG. 5 wherein the comparator 166 is steered by the flip-flop 220.

Figure 9:
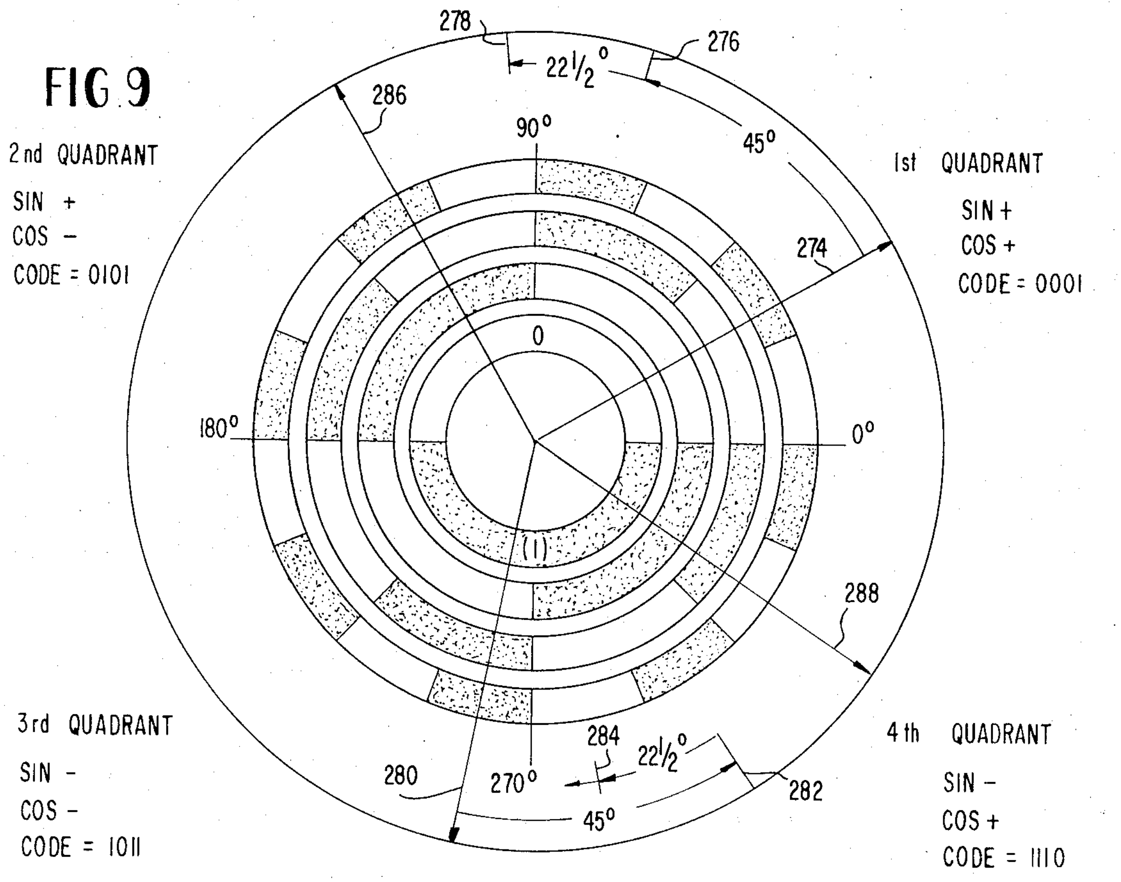
FIG. 9 is a circle diagram showing the operation of the encoder of FIG. 5.

The circle diagram of FIG. 9 shows examples of 4-bit angle encoding in each of the four quadrants. The angle shown at 274 in FIG. 9 in the first quadrant results in the code 0001 being generated. To obtain the first bit decision, the sine input to the comparator is activated by signals $\overline{A}$ and B (from the programmer 162) applied to the base of transistor $Q_1$ forming a part of the NOR gate 194. The resulting positive voltage at the collector of $Q_1$ enables $Q_2$ and disables $Q_4$ and $Q_6$. The sine voltage is positive, which causes a pulse to appear at the 0 output terminal 186. The steering flip-flop had been reset (by the $\overline{A}$ lead in the lower left-hand corner of FIG. 8) before the encoding started and it remains reset. Thus, when the programmer disables $Q_2$, $Q_4$ is enabled, and the comparator is left connected to the cosie terminal in FIG. 8 for the remainder of the encoding. Since the cosine voltage is also positive for the angle 274, the second comparator is left connected to the cosine terminal in FIG. 8 186. The gates at the bases of $Q_{16}$ and $Q_{17}$ are now enabled, however, so the pulse is inverted by transistor $Q_{17}$ and triggers switch $S_3$. This operation, followed by an $S_2$ switch operation, effectively rotates the vector representing the stored angle 45° counterclockwise in FIG. 9 to 276. The cosine voltage is still positive so that the third bit is also zero. The third bit decision (second operation of switches $S_3$ and $S_2$) also rotates the vector in a counterclockwise direction this time by 22½ degrees to the position illustrated at 278 in FIG. 9. The cosine is now negative, so that the fourth bit is a 1, i.e., a pulse appears on output lead 184 and the vector is then rotated (not shown) by 11¼ degrees in a clockwise direction.

The angle in the third quadrant illustrated at 280 in FIG. 9 is encoded as follows:

The first bit is a one because the sine is negative. This causes the steering flip-flop 220 in FIG. 8 to set and remain so for the remainder of the encoding, thus connecting the comparator input, i.e., the base of transistor $Q_9$ to the −cosine terminal through limiter gate 204 ($Q_6$). The voltage at this terminal is positive because $(-)(-)=(+)$. Therefore, the second bit is 0 and $S_3$ is triggered, causing a 45° counterclockwise rotation to the position indicated at 282. The cosine is now positive minus cosine is negative) so that the third bit is (1) and switch $S_4$ is operated, causing 22½ degree clockwise rotation to the position 284. The fourth bit is also (1) and the 11¼ degree step is in a clockwise direction tending to bring the resulting angle toward 270° (cosine=zero).

Angle 286 in the second quadrant and angle 288 in the fourth quadrant are encoded in a similar way, the former approaching 90° (cosine=zero) and the latter approaching 270° (cosine=zero).

OVERALL SEQUENCE OF OPERATION

When the reference voltage applied to the peak detector goes through its negative peak, a negative going output pulse is generated by the peak detector and is illustrated at 338 in FIG. 6. This pulse is applied to the programmer to start an encoding cycle. The programmer as described is a feedback shift register counter with an internal gated shift clock in the form of oscillator 250 and associated circuitry. The clock is stopped when all states of the register are zero. The start pulse sets the input stage which starts the clock.

Feedback is provided from the last flip flop to the first so that a zero is inserted in the first stage whenever a one is present in the last stage. The counter runs through the sequence given by the table in FIG. 6*a*.

Various time intervals during the encoding cycle are identified by the state of the shift register, i.e., the horizontal rows in FIG. 6*a*. After the encoding cycle begins, the state of flip flop A changes from zero to one providing a trigger for switch $S_1$ of FIG. 5 which samples the input sine and cosine signals and zeros the system. The comparator steering flip flop 220 is cleared. Transmission through limiter gate 200 of FIG. 5 is activated by logic NOR gate 194 having $\overline{A}$ and B as inputs. The comparator output terminals 168 and 170 are disconnected from switches $S_3$ and $S_4$ at this time by the gates 176 and 182. Limiter gates 202 and 204 are turned off. At the end of the first clock period the comparator is triggered over lead 164 and the register shifts. Limiter gate 200 preferably has a slight delay in turning off so that the sine $\theta$ signal is still connected to the comparator input lead 206. The comparator delivers negative going pulses with ones and zeros on the separate lines 184 and 186. If sine $\theta$ is less than zero the most significant bit is one and the comparator steering flip flop 220 is set so that the comparator now looks at −cosine $\theta$ when limiter gate 200 turns off. If sine $\theta$ is greater than zero, then the most significant bit is zero, so that the comparator now looks at +cosine $\theta$ when limiter gate 200 turns off. The cosine $\theta$ input to the comparator 166 is provided by turning on limiter gate 202 and alternatively, the −cosine $\theta$ input is applied to the comparator by alternatively turning on limiter gate 204. This switching of the input of the comparator is provided to account for the quadrants in which the stored angle occurs based on the most significant bit determination as described in conjunction with FIG. 9.

During the next clock interval the gates 176 and 182 in the comparator output are enabled so that future comparator output signals will pass through these gates and provide triggers for either switch $S_3$ or switch $S_4$ depending upon which comparator output lead carries a pulse. Either before or at the end of this clock interval, the first switch $S_5$ in each attenuator is closed. The next clock pulse triggers the comparator and either switch $S_3$ or switch $S_4$ closes depending upon the polarity of the charge required to change the stored angle toward 90° (or 270°). The size of the first attenuator capacitor is picked so that the change in angle is either plus or minus 45°.

This process is continued in such a way that each successive angle change is plus or minus one-half the size of the preceding angle change as determined by the total capacitance inserted into the circuit by the successively operated attenuator switches $S_5$ through $S_{13}$. The output binary code is obtained from the comparator either on lead 184 or lead 186.

Figure 10:
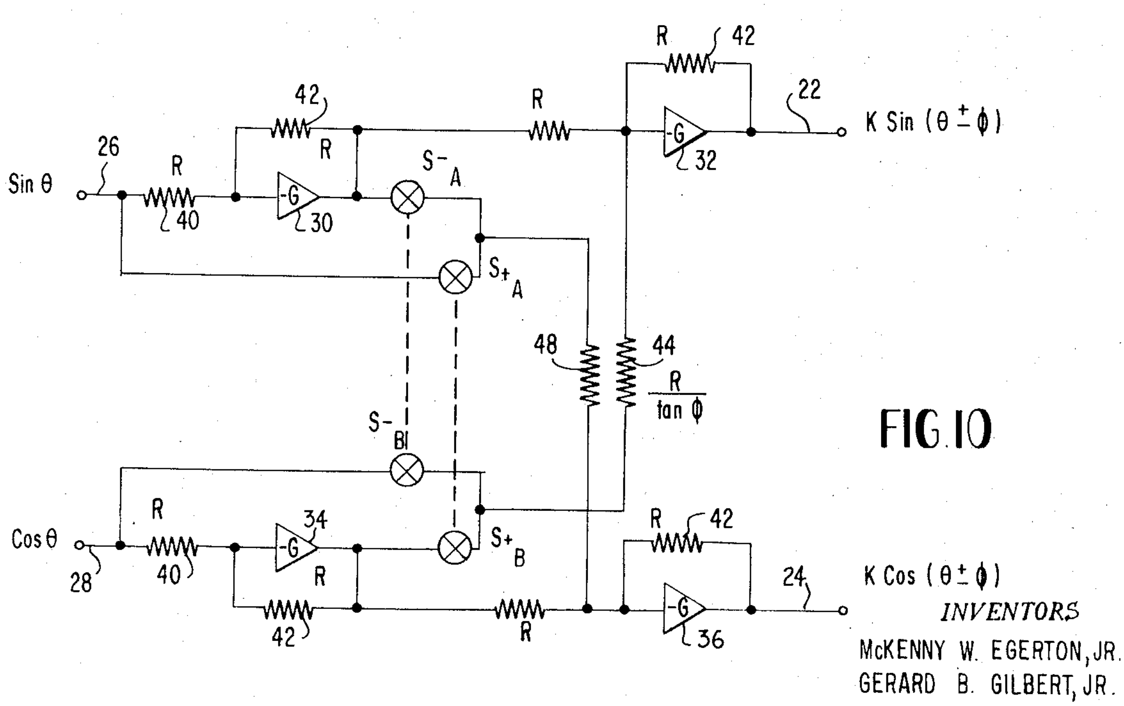
FIG. 10 is a diagram of a portion of a cascade angle encoder constructed according to the present invention.

FIG. 10 shows a modified embodiment illustrating one stage of a cascade converter for encoding angles in accordance with the present invention. This embodiment is based on the electronic angle signal modifier illustrated in FIG. 2 and like parts bear like reference numerals.

In this embodiment in order to account for sign, the electronic angle modifier in FIG. 10 is provided with a first pair of ganged switches $S-_A$ and $S-_B$ and a second pair of ganged switches $S+_A$ and $S+_B$. In FIG. 10 the operation of switch S− produces an angle change of $-\phi$ and the operation of switch S+ produces a change of $+\phi$. A comparator is required at each step of the cascade encoding to determine the sine of desired angle change and control the operation of switches S+ and S−.

Figure 11:
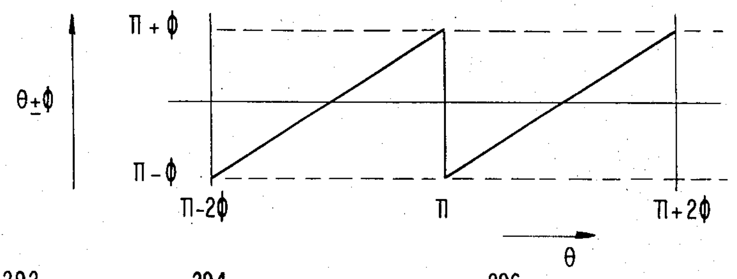
FIG. 11 shows the output angles for a cascade angle encoder incorporating the device of FIG. 10.

When sine $\theta$ is positive, the angle should be increased by $\phi$ and when sine $\theta$ is negative, the angle is decreased. For angles about $\pi$ radians, these conditions result in output angles of $\theta \pm \phi$ shown in FIG. 11.

With successive values for $\phi$ for the cascaded circuits equal to $\pi/4$, $\pi/8$, $\pi/16$, etc. radians, a binary output proportional to the input angle results. Plus rotation at each stage corresponds to an output zero and minus rotation to an output one.

Figure 12:
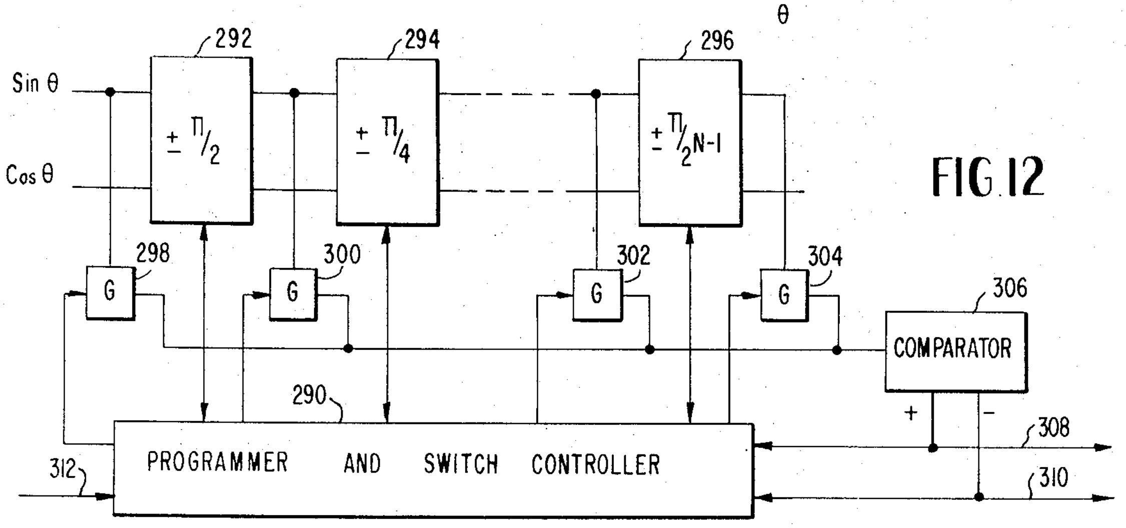
FIG. 12 is a block diagram of an N-bit cascade angle encoder.

FIG. 12 shows such a cascade encoder for N bits. The converter of FIG. 12 comprises a conventional cascade converter programmer 290 and a plurality of angle signal modifiers 292, 294, and 296 all constructed as illustrated in FIG. 10. Also provided are a plurality of gates 298, 300, 302, and 304 which are gated from the programmer 290 in sequence and which couple each of the signal modifiers successively to a comparator 306 of the type previously described and illustrated in FIG. 8 at 166. The outputs appear at the leads 308 and 310.

With successive values of $\phi$ (as determined by the value of resistors 44 and 48 in FIG. 10) for the cascade angle rotators 292, 294, and 296 in FIG. 12 equal to $\pi/2$, $\pi/4$, $\pi/8$, $\pi/16$, etc. radians, a binary output is produced at terminal 308 or 310.

Upon a command pulse supplied by way of lead 312 in FIG. 10, the programmer connects the comparator through operation of the gates to the sine channels of the cascaded rotators ($K$ sine $\theta$). Depending upon the polarity of the sine at each stage the proper switch in the following modifier section is closed and the resulting values of sine $\theta$ are given by Equation 7, $$K \text{ sine } \theta = \text{sine}\left(\theta \pm \frac{\pi}{2} \pm \frac{\pi}{4} \cdots \pm \frac{\pi}{2^{n-1}}\right) \qquad (7)$$

where the plus and minus signs are determined by the comparator in such a way to reduce $\theta$ to $\pi$ as $n$ increases. K depends upon the gains in the various electronic angle signal modifiers and can be made equal to 1. However, it is only necessary that the K's for the sine and cosine of a given signal modifier be equal such as by having resistors 44 and 48 in FIG. 10 equal.

A similar encoder can be constructed with the comparator observing cosine $\theta$ and/or closing the opposite switch for a given sign of the observed voltage. The encoder of FIG. 12 requires simpler logic in the programmer and switch controllers than that of FIG. 5 requires a multiplicity of cascaded stages.

Figure 13:
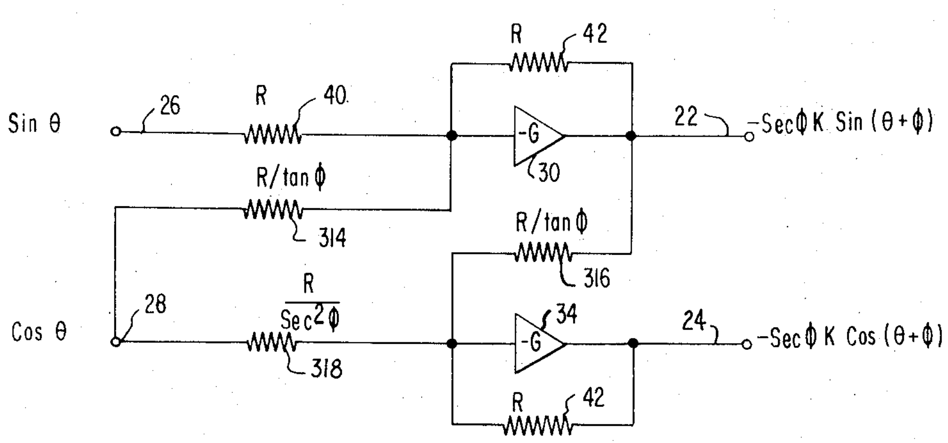
FIG. 13 shows another electronic angle signal modifier for a cascade angle encoder.

FIG. 13 shows a further electronic angle signal modifier which may be provided for the successive stages 292, 294, and 296 of the converter of FIG. 12. Again, like parts bear like reference numerals.

In this embodiment the cross coupling between the sine and cosine channels is effected by a pair of resistors 314 and 316. In addition, the input resistor 318 of operational amplifier 34 is modified in value as indicated on the drawing.

The angle signal modifier in FIG. 13 produces a change of $+\phi$ in the angle and an additional change of $\pi$ with resistors 314 and 316 both being equal to $R$/tangent $\phi$ and input resistor 318 equal to $R$/secant$^2$ $\phi$. The sines are of course changed by the inversion in the minus gain amplifiers 30 and 34 to produce the minus values at the outputs 22 and 24.

In order to produce either a positive or negative angle change, with a signal modifier such as illustrated in FIG. 13, more complicated switching is required than in the device of FIG. 10. In addition, the angle change of $\pi$ produced in each section results in additional programming complexities in a cascaded encoder of the type illustrated in FIG. 11, but these can be readily compensated for by appropriate steering to the comparator as described in the embodiment illustrated in FIG. 5.

It is apparent from the above that the present invention provides a novel angle encoder particularly suited for producing a digital output representative of any angle and particularly a shaft angle. An important feature of the present invention resides in the fact that the device involves no trigonometric approximation but is capable of producing an accurate output within the resolution of the system. It is of relatively simple and inexpensive construction and is completely electronic so as to be susceptible of electrical miniaturization in aerospace applications. Additional important features include the fact that the excitation voltage from the resolver or synchro to which the angle modifier is coupled is utilized only for timing purposes and is not operated upon during the encoding process. This further minimizes inaccuracies inherent in systems which rely upon the resolver signal at some stage of the encoding sequence.

While described in conjunction with angle encoding to produce a binary output it is apparent that other digital output codes may be readily obtained through suiable modification of the attenuator capacitance values or coupling resistors. Similarly, in certain instances, electronic angle changing without encoding may be desired and is provided by the device herein shown and described. The encoder may be of the sequential or continuous type and while the preferred embodiment discloses a charge storage successive approximation type of converter, it is apparent that the basic principles of the present invention are equally applicable to the well known cascade type converters incorporating a separate electronic angle signal modifier for each comparison bit. A basic feature of the present invention resides in the realization that an electrical angle may be electronically changed by adding or subtracting signals representative of tangent $\phi$ cosine $\theta$ from sine $\theta$ and by at the same time adding or subtracting signals representative of tangent $\phi$ sine $\theta$ from cosine $\theta$ in accordance with the trigonometric identities set forth in this disclosure to produce a theoretically exact digital output.

What is claimed and desired to be secured by United States Letters Patent is:

1. An electronic angle encoder comprising sine and cosine channels each including a pair of inverter amplifiers, a feedback storage capacitor in one of the amplifiers in each channel, means for storing on said capacitors signals proportional to the sine and cosine respectively of an angle to be encoded, a comparator, means for supplying said sine and cosine signals from said channels to said comparator for determination of their polarities, a pair of variable capacitance attenuator sections interconnecting said channels for modifying the signal in one channel by the signal in the other channel, digital output means coupled to said comparator, a programmer coupled to sadi comparator for controlling tis operation, and means coupling said programmer to said attenuator sections for varying their attenuation in predetermined steps representative of a series of binarily decreasing angles.

2. An encoder according to claim 1 wherein said programmer includes an internal clock gated off when said encoder is not in operation.

3. An encoder according to claim 1 including steering means coupled to said comparator for periodically connecting said comparator to one of said channels.

4. An electronic angle signal encoder comprising sine and cosine channels each including a pair of inverter amplifiers, said amplifiers having a high negative gain, a feedback storage capacitor in one of the amplifiers in each channel, the feedback through said storage capacitors being sufficient to maintain the inputs of said one amplifier in each channel at a virtual ground potential, means for storing on said feedback capacitors signals proportional to the sine and cosine respectively of an angle to be encoded, a comparator, means for supplying said sine and cosine signals from said channels to said comparator for comparison with each other, a pair of variable capacitance attenuator sections coupled between said channels for modifying the signal in one channel by the signal in the other channel, digital output means coupled to said comparator, a programmer coupled to said comparator for controlling its operation, and means coupling said programmer to said attenuator sections for varying their attenuation in predetermined steps representative of a series of binarily decreasing angles.

5. An encoder according to claim 4 wherein said programmer includes an internal clock gated off when said encoder is not in operation.

6. An electronic angle encoder comprising a sine channel for developing sine $\theta$ signals where $\theta$ is an angle to be encoded, a cosine channel for developing cosine $\theta$ signals, a pair of attenuators each having variable impedance values representative of tangent $\phi$ where $\phi$ is a binarily decreasing angle, said attenuators interconnecting said channels whereby a signal representative of tangent $\phi$ sine $\theta$ is supplied from said sine channel to said cosine channel and a signal representative of tangent $\phi$ cosine $\theta$ is supplied from said cosine channel to said sine channel, means for sampling said channels to determine the sign of sine $\theta$ and cosine $\theta$, a comparator, a programmer, switch means operated by said programmer for periodically coupling said one of said channels to said comparator, means coupling said programmer to said attenuators for varying their attenuation, said programmer acting to couple one of said channels to said comparator each time the attenuation values of said attenuators are changed, and output means coupled to said comparator for producing digital output representative of the angle $\theta$.

7. Apparatus according to claim 6 including an AC source of sine and cosine signals coupled to said sine and cosine channels.

8. Apparatus according to claim 6 including a resolver coupled to said sine and cosine channels.

9. Apparatus according to claim 8 including a peak detector for triggering said programmer, and means coupling said peak detector to the exciter coil of said resolver.

10. An electronic angle signal modifier comprising sine and cosine channels each having an input and an output, means for coupling an analog signal representative of the sine of an angle to be encoded to the input of said sine channel and a signal representative of the cosine of the same angle to the input of said cosine channel, electrical signal storage means in each of said channels, third and fourth electrical signal storage means, first switch means for coupling said third storage means to the output of said sine channel and said fourth storage means to the output of said cosine channel whereby said third storage means develops a signal representative of the output of said sine channel and said fourth storage means develops a signal representative of the output of said cosine channel, and second switch means for coupling said third storage means to the input of said cosine channel and said fourth storage means to the input of said sine channel, whereby the signal of said third storage means is transferred to said storage means in said cosine channel and the signal of said fourth storage means is transferred to the storage means in said sine channel.

11. Apparatus according to claim 10 wherein said storage means are all capacitors.

12. An electronic angle signal modifier comprising sine and cosine channels, each having an input and an output, means for coupling an analog signal representative of the sine of an angle to be modified to the input of said sine channel and a signal representative of the cosine of the same angle to the input of said cosine channel, a storage capacitor in each of said channels, said storage capacitors each being connected in the feedback path of a charge transfer amplifier, third and fourth capacitors, first switch means for coupling said third capacitor to the output of said sine channel charge transfer amplifier and said fourth capacitor to the output of said cosine channel charge transfer amplifier, and second switch means for coupling said third capacitor to the input of said cosine channel charge transfer amplifier, and said fourth capacitor to the input of said sine channel charge transfer amplifier.

13. Apparatus according to claim 12 wherein each said charge transfer amplifier has a high negative gain and its input is held in a virtual ground potential by feedback through one of said storage capacitors.

14. Apparatus according to claim 13 including an inverter coupled to one of said third and fourth capacitors between the output of one of said channels and the input of the other channel.

15. An electronic angle encoder comprising sine and cosine channels each having an input and an output, each channel including a pair of inverter amplifiers connected in series, means for coupling an analog signal representative of the sine of an angle to be encoded to the input of said sine channel and a signal representative of the cosine of the same angle to the input of the cosine channel, a pair of attenuators interconnecting said channels for supplying a signal from one channel to the other, a comparator, means for periodically coupling said comparator to at least one of said channels for periodically comparing the signal in said channel with a reference signal, digital output means coupled to said comparator, a programmer coupled to said comparator for controlling its operation, and means coupling said programmer to said attenuators for varying their attenuation in predetermined steps.

16. A cascade signal encoder comprising a plurality of electronic angle signal modifier stages, each of said stages including a sine and cosine channel, means for coupling an analog signal representative of the sine of an angle to be encoded to the input of the first stage of said sine channel and for coupling a signal representative of the cosine of the same angle to the input of the first stage of said cosine channel, means interconnecting the sine and cosine channels in each stage, means coupling said modifier stages in series, a comparator coupled to the output of at least the last modifier stage for determining the sign of its output, a programmer coupled to said comparator for controlling its operation, and means for deriving an output signal from said comparator.

17. A cascade signal encoder comprising a plurality of electronic angle signal modifier stages, each of said stages including a sine and cosine channel, means for coupling an analog signal representative of the sine of an angle to be encoded to the input of the first stage of said sine channel and for coupling a signal representative of the cosine of the same angle to the input of the first stage of the cosine channel, means interconnecting the sine and cosine channels in each stage for supplying a signal representative of a function of a known angle from one channel to the other, said interconnecting means decreasing in electrical value with successive stages in accordance with the progression $\pi/2$, $\pi/4$, $\pi/8$ . . . $\pi/2^{n-1}$, where $n$ is the number of stages, comparator means, means for coupling said comparator means to the output of each stage, means for developing a digital output from said comparator means, switch means in each stage for changing the sign of the signal supplied from one channel to the other in each stage, a comparator, gating means for successively coupling said comparator to the output of each stage, and a programmer coupled to said switch means in each stage for operating said switch means in accordance with the sign of the output signal from the next preceding stage.

References Cited

UNITED STATES PATENTS

| | | | |
|---|---|---|---|
| 3,119,105 | 1/1964 | Jepperson | 235—154X |
| 3,188,624 | 6/1965 | McMillian | 340—347 |
| 3,250,905 | 5/1966 | Schroeder et al. | 235—197 |
| 3,480,946 | 11/1969 | Di Meo | 340—347 |

MAYNARD R. WILBUR, Primary Examiner

M. K. WOLENSKY, Assistant Examiner

U.S. Cl. X.R.

235—154, 186

PO-1050
(5/69)

UNITED STATES PATENT OFFICE
CERTIFICATE OF CORRECTION

Patent No. 3,555,541 Dated January 12, 1971

Inventor(s) McKenny W. Egerton, Jr. and Gerard B. Gilbert, Jr.

It is certified that error appears in the above-identified patent and that said Letters Patent are hereby corrected as shown below:

In Column 4, line 36, "intetrchanging" should read --interchanging--. Column 5, line 19, "+θ" should read --+ø--. Column 5, line 21, "Tangent θ" should read --Tangent ø--. Column 6, line 10, "angles" should read --angle--. Column 8, line 68, "these" should read --those Column 9, line 48, "cosie" should read --cosine--. Column 9, line 51, after "comparator" insert --decision also causes a pulse at output terminal 186-- and cancel "is left connected to the cosine terminal in Fig. 8 186". Column 9, line 75, "mi-" should read --(mi- --. Column 11, line 65, before "requires" insert --but--. Column 12, line 36, "suiable" should read --suitable--. Column 12, line 69 (claim 1), "sadi" should read --said-- and "tis" should read --its--. Column 13, line 45 (claim "digital" should read --a digital--.

Signed and sealed this 2nd day of November 1971.

(SEAL)
Attest:

EDWARD M.FLETCHER, JR.
Attesting Officer

ROBERT GOTTSCHALK
Acting Commissioner of Pa